May 22, 1928.  
E. C. JACKSON  
BOOSTER MOTOR SUPPORT  
Filed Sept. 3, 1926

1,670,541

Inventor  
Edwin C Jackson  
By Cornwall, Bedell & James  
Attys.

Patented May 22, 1928.

1,670,541

UNITED STATES PATENT OFFICE.

EDWIN C. JACKSON, OF ST. LOUIS, MISSOURI, ASSIGNOR TO COMMONWEALTH STEEL COMPANY, OF GRANITE CITY, ILLINOIS, A CORPORATION OF NEW JERSEY.

BOOSTER-MOTOR SUPPORT.

Application filed September 3, 1926. Serial No. 133,405.

My invention relates to railway rolling stock and consists in an improved method of supporting a booster motor particularly adapted for use in connection with the application of a booster motor to one or more of the axles of a locomotive tender, but also adapted for use in connection with other truck axles.

The main object of my invention is to support the booster motor from the superstructure carried by the truck and more specifically to support the booster motor at the point where the truck and superstructure are pivoted to each other.

Additional objects of my invention are to adapt the truck and superstructure framing for such booster motor support arrangements and to transmit the superstructure load to the truck in such a manner that the truck frame will not have to be increased in depth at a point intermediate its sides in order to support the booster motor, it being desirable to keep the depth of the truck frame at a minimum in order to avoid raising the center of gravity of the tender tank or other superstructure or to avoid reduction in the capacity of the same.

In the accompanying drawings which illustrate a selected embodiment of my invention—

Figure 1:
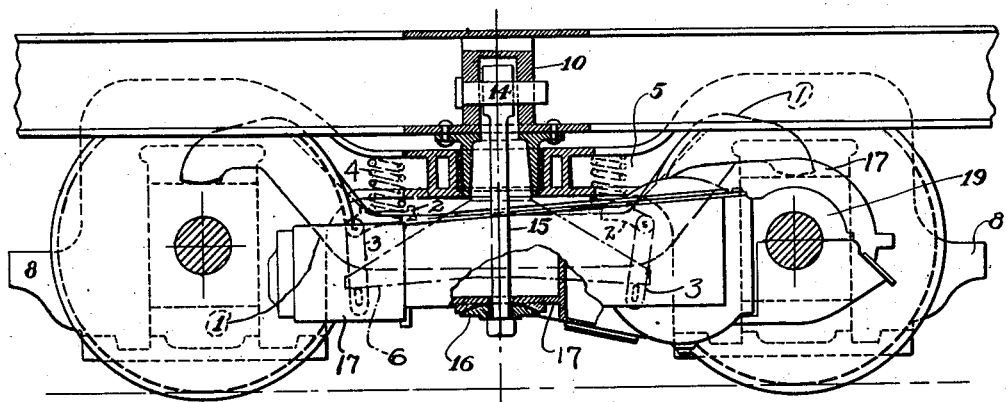
Figure 1 is a longitudinal section through the center of a tender underframe and four wheel truck frame, other truck parts and the booster motor being indicated.
Figure 2:
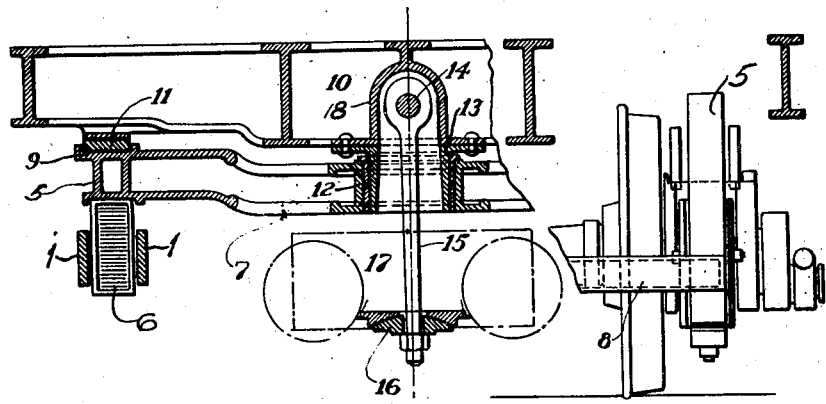
Figure 2 is in part a transverse section through the center of the truck frame, adjacent parts of the underframe being indicated, and in part an end view of the truck.

The truck comprises the usual wheels and axles having journal boxes which carry the double equalizers 1 provided with spring seats and brackets 2; the truck frame being supported by the equalizers through hangers 3 and leaf springs 6. Undue tilting of the truck frame is prevented by the coil springs 4. The truck frame is preferably formed of a one-piece casting and includes wheel pieces 5 having integral pedestal forming portions and connected by transverse transoms 7 and 8. The wheel pieces are provided with upwardly facing side bearing pockets 9 through which the superstructure load is transmitted directly to springs 6 and 4, thereby avoiding the necessity of deep transom or bolster sections for carrying the load transversely of the truck. This enables the transoms 7 to be used only as transverse ties for the frame and as means for centering the underframe bolster 10 which is provided with downwardly facing side bearings 11.

The truck transoms 7 and the underframe bolster 10 have cooperating center plate elements 12 and 13, respectively, which are annular in shape and provide a large opening about the axis of the pivotal connection between the truck and underframe. Above this opening the bolster side walls are provided with bearings for a horizontal pin 14 which pivotally supports a link 15 which passes downwardly through the center plate elements 12 and 13 and at its lower end carries a bearing 16 having a spherical contour and forming a support for the bed of the booster motor 17. This motor is operatively connected to the righthand axle of the truck and is adapted to drive the latter when the locomotive is starting or laboring under a heavy load.

The side walls of the bolster are connected by longitudinal ribs 18 on each side of the bearings for pin 14 and these ribs are connected over the top of the link 15 and form a downwardly opening pocket for the pin and link.

The construction illustrated and described permits the booster motor to swing about the center of the truck with the axle to which it is connected and also permits the motor to tilt in vertical planes, extending longitudinally and transversely of the center line of the truck, as may be required by vertical movement of one or both ends of the axle in their respective pedestals. Supporting the motor from the superstructure underframe at the pivotal connection between the truck and superstructure results in a substantially stationary position of the portion of the motor supported by link 15. When the truck swivels, the motor bearings 19 on the axle are not called upon to shift the portion of the motor supported by link 15 and therefore are not required to overcome the inertia of the weight of the rear end of the motor exerted at the end of a lever corresponding to the length of the motor as would be the case if the rear support of the motor were spaced from the truck center plate.

This structure can be made without increasing the depth of the transoms or underframe and forms a simple and effective method of supporting a booster motor applied to a tender truck.

The various advantages of this structure may be similarly attained by the use of numerous modifications of the details of my construction and I contemplate the exclusive use of such modifications as fall within the scope of the principles of my invention as expressed in my claims.

I claim:

1. In combination, a railway truck including an axle and a frame, superstructure mounted on said truck, a booster motor operatively connected to said axle, and means, extending through an opening in said frame, for supporting said motor from said superstructure.

2. In combination, a railway truck including an axle and a frame, a center plate on said frame, there being a vertical opening therethrough, superstructure mounted on said truck, a booster motor operatively connected to said axle, and means, extending through said opening, for supporting said motor from said superstructure.

3. In combination, a railway truck including an axle, a booster motor operatively connected thereto, superstructure mounted on said truck, said truck and superstructure having cooperating center plates, and a support member for a booster motor extending through said center plates.

4. In combination, a truck including an axle, a booster motor operatively connected to said axle, a superstructure bolster mounted on said truck, and means for supporting said booster motor from said bolster.

5. In a railway vehicle, a body bolster and a booster motor supported therefrom.

6. In a railway vehicle, a body bolster including a center plate element and a booster motor supported from said bolster by a member extending through said element.

7. In a railway vehicle, a body bolster including spaced parallel walls, a link between said walls and pivotally suspended therefrom, a truck including an axle, and a booster motor operatively connected to said axle and supported by said link.

8. In a railway vehicle, a body bolster including a centrally located downwardly facing pocket, a link having its upper end pivotally mounted in said pocket, a truck including an axle, and a booster motor operatively connected to said axle and supported by said link.

9. In combination, a railway truck including a frame having wheel pieces, a body bolster resting on said wheel pieces, and a booster motor supported from said bolster.

10. In combination, a railway truck including a frame having wheel pieces, a body bolster resting on said wheel pieces, and a booster motor pivotally supported from said bolster by a universal joint bearing.

11. In combination, a railway truck including a frame having wheel pieces and a transom connecting them, a body bolster resting on said wheel pieces, a booster motor operatively connected to one of the truck axles, and a member extending through said transom between said wheel pieces and supporting said booster motor from said bolster.

12. In a railway vehicle, a body structure, a truck pivoted to said structure and having an axle, a booster motor operatively connected to said axle and supported from said body at a point nearer to the truck pivot than said axle.

13. In a railway vehicle, a body structure, a truck pivoted to said structure and having an axle, a booster motor operatively connected to said axle and supported from said body at a point adjacent to the pivotal connection between said body structure and said truck.

14. In a railway vehicle, a truck having spaced axles, superstructure, and a booster motor connected to one of the truck axles and suspended from said superstructure between said axles.

15. In a railway vehicle, a truck having spaced axles, superstructure, a booster motor connected to one of the truck axles and a pivotal connection between said axles suspending said motor from a single point on said superstructure but leaving the motor free to pivot or tilt with the axle to which it is connected independently of the movement of said superstructure.

In testimony whereof I hereunto affix my signature this 30th day of August, 1926.

EDWIN C. JACKSON.